G. M. SPENCER.
FLUID PRESSURE PURIFYING SYSTEM.
APPLICATION FILED AUG. 14, 1909.
1,100,688.
Patented June 16, 1914.
2 SHEETS—SHEET 1.
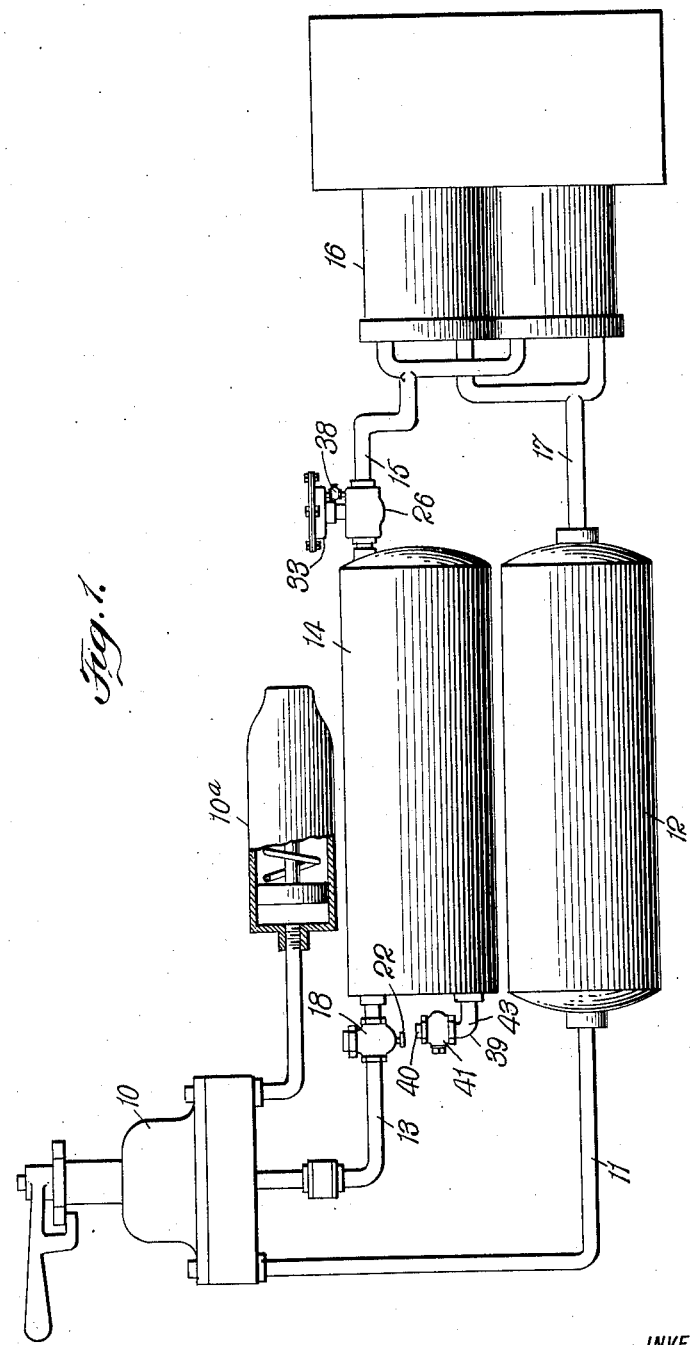
WITNESSES:
INVENTOR
George M. Spencer
BY
Criswell & Criswell
ATTORNEYS G. M. SPENCER.
FLUID PRESSURE PURIFYING SYSTEM.
APPLICATION FILED AUG. 14, 1909.
1,100,688.
Patented June 16, 1914.
2 SHEETS—SHEET 2.
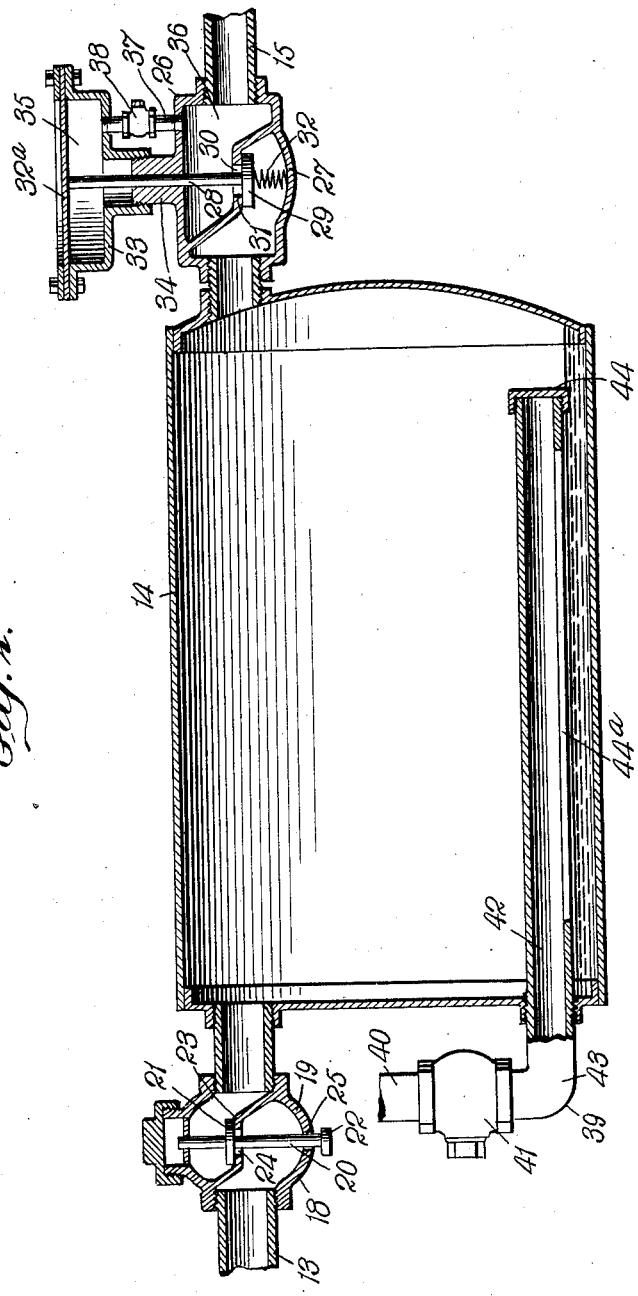

UNITED STATES PATENT OFFICE.

GEORGE M. SPENCER, OF ST. LOUIS, MISSOURI, ASSIGNOR TO FREDERIC W. LORD, OF NEW YORK, N. Y.

FLUID-PRESSURE-PURIFYING SYSTEM.

1,100,688. Specification of Letters Patent. Patented June 16, 1914.

Application filed August 14, 1909. Serial No. 512,875.

*To all whom it may concern:*

Be it known that I, GEORGE M. SPENCER, a citizen of the United States, and a resident of St. Louis, State of Missouri, have invented certain new and useful Improvements in Fluid - Pressure - Purifying Systems, of which the following is a full, clear, and exact description.

This invention relates more particularly to a system for cleaning or purifying an elastic fluid used for compression purposes and especially air employed as a part of an air-brake system for railway purposes, such as disclosed in my Patent No. 877,959, granted to me February 4th, 1908. In the patent referred to a large part of the air used in the operation of the air-brake system is trapped under a reduced pressure for re-use, and this air or volume by expansion is reduced in temperature thereby decreasing the heat caused by compression. In this patent and in the ordinary system employed in connection with brake systems or other air compression methods, such as air-hoist means and in mines, quarries, etc., where a compression or power cylinder is employed and particularly in dusty locations the air which is used becomes more or less contaminated and mixed with dust, ashes and other gritty matter which is very objectionable, inasmuch as it is liable to cut and destroy the working parts of the machinery. The air drawn in by the pump which is supplied from the engineer's valve or power cylinder after the brakes are applied, as for example in my patent referred to, is drawn from the atmosphere. In certain systems where the air is drawn from the outside by the usual compression pump, it has been proposed to provide a screen or similar method to remove some of the dust or other gritty matter, but this is very ineffective and is further objectionable from the fact that a screen would soon become clogged with the dust requiring much greater power for the pump or other means to draw the air into the compression cylinders, thereby materially adding to the power required and likewise resulting in considerable loss without effecting a proper cleaning or purification of the air or other elastic fluid.

The primary object of the invention is to overcome the objections referred to and to provide means which is applicable to a fluid-pressure brake system such as disclosed in my patent and for many other purposes in which air or an elastic fluid may be drawn directly from the atmosphere and substantially all the particles of dust or other gritty or objectionable matter which is likely to injure the pump or other mechanism may be effectually removed, and in such a way that there will be no loss of power through the operation of the machinery and least possible restriction to the pump intake.

Another object of the invention is to provide simple and efficient means and method whereby the air may be cleaned or purified as the same enters a tank or receptacle.

A further object of the invention is to provide simple means which may be used in connection with trapping and re-use of air from an engineer's valve of a brake system or other power cylinder.

With these and other objects in view, the invention will be hereinafter more particularly described with reference to the accompanying drawings, which form a part of this specification, and will then be pointed out in the claims at the end of the description.

In the drawings, Figure 1 is an elevation partly diagrammatic, of one form of means embodying my invention; and Fig. 2 is an enlarged sectional view, partly in elevation, of a part of the means for trapping the air and the means employed for purifying the air or fluid.

While I show and shall describe the invention as applied more particularly to an air-brake system such as may be employed for street and similar railway cars or trains, it is to be understood that the means and method employed in connection with the purification of the air or elastic fluid may be used for various purposes, whether in mines, quarries, air-hoists or in other connections, and that in certain cases some of the parts shown may be dispensed with.

The engineer's valve 10 may be connected to a brake cylinder 10ª and by means of a pipe or connection 11 to a supply tank 12. A connection 13 extends from the valve 10 to a tank or receptacle 14, and leading from the receptacle 14 is a pipe 15 connected to the inlet of a pumping element 16 which may be operated by a motor or otherwise, and the outlet of the pumping element 16 may be connected by a pipe 17 to the supply tank or reservoir 12. These parts while differing slightly in appearance and construction from that shown in the patent referred to are substantially the same in principle and in operation so far as the features referred to are concerned.

A valve 18 is used in the pipe or connection 13 from the engineer's valve 10, and this valve is of an automatic type which will permit air or a fluid to pass within the tank or receptacle 14, but not to return through said valve. This valve has a casing 19 and movable in the casing is a valve stem 20 on which are arranged disk-like or other valves 21 and 22. The valve 21 when resting on the seat 23 is adapted to close an opening 24 and the valve 22 controls an opening 25 in said casing. As will be seen when air from the engineer's valve or device 10 is operated to apply the brakes, the exhaust from the cylinder or a large part thereof will pass under pressure through the connection 13, and will raise the valve 21 from its seat, closing the opening 25 by means of the valve 22 until the pressure within the tank substantially equals that in the brake cylinder. At this time owing to the greater area of the valve 21, the stem will be forced downward to close the opening 24, and open the opening 25 permitting the surplus air to escape into the atmosphere.

The connection 15 leading to the pump or pumping element 16 may be provided with an automatic valve 26 to provide against leakage through the pump. As shown this valve has a casing 27 in which a stem 28 is movable. This stem 28 carries a valve 29 which is adapted to close an opening 30 in the valve seat 31, and said valve is normally forced toward its seat by a spring 32. The end of the stem 28 bears against or is attached to a diaphragm $32^a$ which is held in the casing or member 33, and said casing 33 may be held to an extension or part 34 forming a part of the casing 27, said part 34 serving to guide the stem 28. The diaphragm $32^a$ is so arranged in the member or casing 33 of the valve as to provide a chamber 35, and connecting this chamber with the chamber 36 of the valve casing 27 is a pipe 37 in which is a check valve 38 which opens inwardly. When the pump operates to withdraw the air from the tank 14 to force the same into the main supply tank or reservoir or other place, it will withdraw the air from under the diaphragm $32^a$ through the connection 37, and owing to the greater area or surface of said diaphragm as compared with the valve 29, the said valve will be forced from its seat to permit the air from the tank 14 to be withdrawn therefrom, but as soon as the pump stops, there will be sufficient leakage past the stem 28 into the chamber 35 to permit the valve 29 with the assistance of the spring 32 to become seated, thereby preventing the escape of air from the tank 14, though a separate passage or port may be provided for this purpose.

To purify the air when drawn from the atmosphere to supply the amount lacking when the pump is operating and which does not come from the power device or cylinder, I arrange at or near the bottom of the tank 14, a device or connection 39. This device 39 is angular in form and has one part, as 40, opening into the atmosphere and provided with a check valve 41 to permit the air to pass into the device but not backward therefrom, and said connection has a part 42 leading into the tank or receptacle 14. The part 40 may be at right angles to the inwardly-extending part 42 so that the air while being drawn within the device 39 will be deflected at an angle and will strike the angular portion 43 of said device. As the pump operates, the pressure within the tank will be reduced below that of atmospheric pressure, and the atmospheric air will then enter said device through the open end 40 and will pass downward striking the bottom of the part 43 which will force the dirt and other objectionable matter to the bottom where the dust and dirt will collect, leaving the air above the same substantially free from such particles. The objectionable matter collected at the point 43 is pushed along by the moving air into the tubular part 42, the more or less clean air remaining at the upper portion of said tubular part 42. This tubular part 42 is provided with a cap 44 at one end and an elongated slot $44^a$ under the same through which the air under pressure passes. This will cause the air to be again deflected before it can pass into the tank or receptacle 14, and this will serve to drive the dust and other objectionable matter directly to the bottom of the tank. The air as it passes through the opening of the slot $44^a$ of the device will expand, it having been found that the expansion and the positive driving and deflection of the air will cause the particles of dust and other gritty material to remain at the bottom of the tank, though the tank may have water or a liquid, as oil, applied to the lower part thereof to assist in the adhesion and the holding of the dust, etc., at the bottom of the receptacle, but in practice this is not necessary as much will depend upon the relative proportion and sizes of the parts. By this means, the dust and other particles which are likely to injure the working parts of the machinery will remain at the bottom of the tank and will not again commingle with the air so that the latter can be withdrawn from the tank 14 in such a way that the open end of the part 40 will provide free access for the air, thus the liability to clogging is overcome and the efficiency of the apparatus is materially increased.

It will be seen that under the construction the air in its flow to the pump or compressor intake has the least possible restriction and particularly only that which is due to the natural friction and that such unrestricted flow is very desirable and in fact necessary to the practical working of an apparatus of this kind. It will be further seen that the air with the dust-laden particles or other gritty matter as it enters the open end of the part 40 descends in a vertical direction serving to force the particles therewith, and owing to the deflecting of the air at the part 43, the particles will be collected at this point and will be moved bodily and into the tubular part 42 at substantially right angles to its inflow causing the particles to move along the bottom of the tubular part 42, and as the air is again deflected through the slot 44ª, it will positively drive and force the particles to the bottom of the receptacle against the wall thereof or a suitable liquid or other adhesive substance on the bottom of the tank, and owing to the said deflection and the expansion, the air free of its particles will pass to the upper part of the tank leaving the said particles at the bottom thereof. This action of the device, therefore, does not restrict the flow of the air except for a minimum of natural friction as the openings are large enough for this purpose, and there is, therefore, no increase, decrease or retarding of the natural flow of the air or gaseous fluid. The invention, therefore, accomplishes an effective purification of the air and gaseous fluid by the flow of the volume of air, deflection, gravity, expansion, distribution and adhesion either on the tank direct or by a suitable liquid contained in the tank, and it will be seen that the particles are positively driven and actually applied to the bottom of the tank causing the purified air when once separated to pass directly from and out of contact of the particles separated therefrom.

In trapping the air and utilizing the same from a power cylinder, the air after being used is exhausted through the connection 13 past the valve 18 as already explained, into the tank 14 from which it may be pumped into a supply tank by the pumping means 16 or otherwise, and as the pump or pumps continue to operate, any lack of air within the tank 14 will cause the air from without to pass through the device 39 and to be deflected causing the dust to settle at the bottom at the part 43, and to be carried along by the volume of air, and as the air expands due to the reduction below atmospheric pressure in the tank 14, the particles will be dropped directly on the bottom and will remain there leaving the air with the tank and which is pumped from the top thereof through the connection 15 substantially free from dust and other gritty or objectionable matter which is likely to injure the machinery.

From the foregoing, it will be seen that simple and efficient means is provided for purifying an elastic fluid as air; that the method and means herein disclosed is adapted for various purposes and in various connections; that said means for purifying the fluid may be used in connection with an air-brake system or independent thereof; that simple means is provided for trapping a large part of the air used for air-brake and other mechanisms for re-use; and that simple means is provided whereby the air or fluid may be properly controlled.

Having thus described my invention, I claim as new and desire to secure by Letters Patent:—

1. In a system for purifying an elastic fluid, a receptacle having an inlet and an outlet, controlling means for the outlet, said inlet consisting of sharply angled piping, a depositing surface for the impurities lying under said piping, the said piping having a portion thereof immediately overlying and parallel to the depositing surface, and a slot on the under side of said portion of the piping through which the fluid is deflected upon the depositing surface.

2. A method of purifying an elastic fluid which consists in causing the fluid to flow into a chamber at a point immediately above an adhesive surface, the fluid being deflected to partly separate the impurities before reaching the chamber and then causing the fluid to have a second deflection to impinge it upon the adhesive surface to drive the impurities thereupon and to permit it to expand within the chamber.

3. The method of purifying an elastic fluid, which consists in causing the fluid to flow into a chamber at the lower part thereof and to be deflected at substantially right angles from its inflow before reaching the chamber, causing the fluid after being deflected to pass at substantially right angles to its former flow before its deflection and causing the same to drive the separated particles along with the same and then deflecting the fluid a second time to drive the particles to the bottom of the chamber and to expand within the chamber, the fluid having an unrestricted flow to, through and from the chamber.

4. The method of purifying air, which consists in causing the air to flow into a chamber at the lower part thereof and to be deflected at substantially right angles from its inflow before reaching the chamber, causing the air after being deflected to flow at substantially right angles to its former flow before its deflection, then deflecting the air a second time to drive the particles to the bottom of the chamber and to expand within said chamber.

5. The method of purifying an elastic fluid, which consists in causing the fluid to flow into a chamber at the lower part thereof and to be deflected to partly separate the impurities before reaching the chamber, and then causing the fluid to have a second deflection and to expand within the chamber and to drive the impurities to the bottom thereof.

6. The method of purifying an elastic fluid, which consists in causing the fluid to have a substantially unrestricted flow into a chamber at the lower part thereof and to be deflected at substantially right angles from its inflow before reaching the chamber, causing the fluid after being deflected to flow at substantially right angles to its former flow before its deflection and causing the same to drive the particles along with the same and separated therefrom, and then deflecting the air a second time to drive the particles to the bottom of the chamber and to enter and expand within said chamber, the fluid having an unrestricted flow from and through the chamber.

7. The combination with a receptacle having an outlet, of pumping means connected to the outlet, and a device comprising an angular tubular and horizontally arranged connection having a part provided with a slot and extending within the receptacle, and a part communicating with the atmosphere and arranged at an angle with respect to the inwardly extending part.

8. The combination with a receptacle having an outlet, of pumping means connected to the outlet, and a device comprising a tubular connection having a part provided with a slot and extending within the tank, and a part communicating with the atmosphere, and a check valve arranged in said latter part.

9. The combination with a receptacle having atmospheric and pressure inlets and an outlet, a pumping element connected to said outlet, automatically actuated valves arranged in the outlet and pressure inlet, means to open said outlet at starting of said pumping element, and means to close said outlet after the pumping element is out of operation.

10. The combination with a receptacle having atmospheric and pressure inlets and an outlet, a pumping element connected to said outlet, an automatically actuated valve arranged in the outlet and in the pressure inlet, means to open said outlet at starting of said pumping element, means to close said outlet after the pumping element is out of operation, and means whereby the fluid may be exhausted when its pressure substantially equals the pressure in the receptacle.

11. The combination with a receptacle having an inlet and an outlet, a source of pressure supply for the inlet, means for exhausting the receptacle, and a valve for controlling the source of supply and having an outlet communication whereby the fluid may be caused to automatically escape when the pressure within the receptacle and that of the supply is substantially equal.

12. The combination with a receptacle having an inlet and an outlet, a source of pressure supply for the inlet, means for exhausting the receptacle, and means for controlling the source of supply and having means whereby the fluid may be caused to automatically escape when the pressure within the receptacle and that of the supply is substantially equal.

13. In a system for purifying an elastic fluid, a receptacle having an inlet and an outlet, inlet and outlet controlling means, said inlet comprising sharply angled piping, a slot in said piping and a depositing surface for the impurities lying under and adjacent to said slot and parallel therewith.

This specification signed and witnessed this 11th day of August A. D. 1909.

GEORGE M. SPENCER.

Witnesses:
W. A. TOWNER, Jr.,
C. BARTELS.

---

Copies of this patent may be obtained for five cents each, by addressing the "Commissioner of Patents, Washington, D. C."